US012150007B1

(12) United States Patent
Dugar et al.

(10) Patent No.: US 12,150,007 B1
(45) Date of Patent: Nov. 19, 2024

(54) CONTEXT BASED ACTION MENU

(71) Applicant: Samsara Inc., San Francisco, CA (US)

(72) Inventors: Aditi Dugar, Redwood City, CA (US); Sean McGee, Woodstock, GA (US); Yogesh Bhumralkar, Belmont, CA (US); Faiz Abbasi, San Francisco, CA (US); Jennifer Kao, San Francisco, CA (US); Zack Littke-Smith, San Francisco, CA (US); Lucas Doyle, San Francisco, CA (US); Christopher Siling Xue, San Francisco, CA (US)

(73) Assignee: Samsara Inc., San Francisco, CA (US)

( * ) Notice: Subject to any disclaimer, the term of this patent is extended or adjusted under 35 U.S.C. 154(b) by 0 days.

(21) Appl. No.: 18/467,014

(22) Filed: Sep. 14, 2023

Related U.S. Application Data

(63) Continuation of application No. 17/816,566, filed on Aug. 1, 2022, now Pat. No. 11,800,317.

(60) Provisional application No. 63/363,891, filed on Apr. 29, 2022.

(51) Int. Cl.
*H04W 4/021* (2018.01)
*G06F 3/04817* (2022.01)
*G06F 3/0482* (2013.01)
*H04W 4/024* (2018.01)

(52) U.S. Cl.
CPC ........ *H04W 4/021* (2013.01); *G06F 3/04817* (2013.01); *G06F 3/0482* (2013.01); *H04W 4/024* (2018.02)

(58) Field of Classification Search
CPC ..... H04W 4/024; H04W 4/021; G06F 3/0482; G06F 3/04817
See application file for complete search history.

(56) References Cited

U.S. PATENT DOCUMENTS

| 2007/0238476 | A1* | 10/2007 | Sharma | ................. | H04W 68/00 455/515 |
| 2014/0040344 | A1 | 2/2014 | Gehring et al. | | |
| 2017/0329478 | A1 | 11/2017 | Chen et al. | | |
| 2021/0014287 | A1 | 1/2021 | Kimball et al. | | |

OTHER PUBLICATIONS

U.S. Appl. No. 17/816,566, filed Aug. 1, 2022, Context Based Action Menu.
"U.S. Appl. No. 17/816,566, Notice of Allowance mailed Jun. 27, 2023", 7 pgs.

* cited by examiner

*Primary Examiner* — Gerald Johnson
(74) *Attorney, Agent, or Firm* — Schwegman Lundberg & Woessner, P.A.

(57) ABSTRACT

A quick action menu system may be configured to perform operations that include: causing display of a graphical user interface (GUI) at a client device, the GUI comprising a display of a persistent icon at a position within the GUI; receiving a selection of the persistent icon from the client device; accessing user profile data associated with a user of the client device responsive to the input that selects the persistent icon; and causing display of a quick actions menu to display content associated with the user profile data.

17 Claims, 7 Drawing Sheets

CONTEXT BASED ACTION MENU

PRIORITY APPLICATIONS

This application is a continuation of U.S. patent application Ser. No. 17/816,566, filed Aug. 1, 2022, which claims priority to U.S. Provisional Patent Application Ser. No. 63/363,891, filed Apr. 29, 2022, the disclosure of which are incorporated by reference herein in their entireties.

TECHNICAL FIELD

Embodiments of the present disclosure relate generally the field of graphical user interfaces (GUI), and more specifically to the selective display of content within GUI.

BACKGROUND

Due to the increased importance of mobile devices in a professional driver's daily workflow, ensuring the drivers are not distracted while their vehicle is in-motion is an essential part of ensuring successful and safe business operations. In particular, administrators want their drivers to physically interact with their device as little as possible, especially while the vehicle is in-motion. One way to reduce driver interaction while in-motion is to selectively populate a driver's device with only contextually relevant information that they would normally have to search for. Accordingly, the disclosed system provides

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
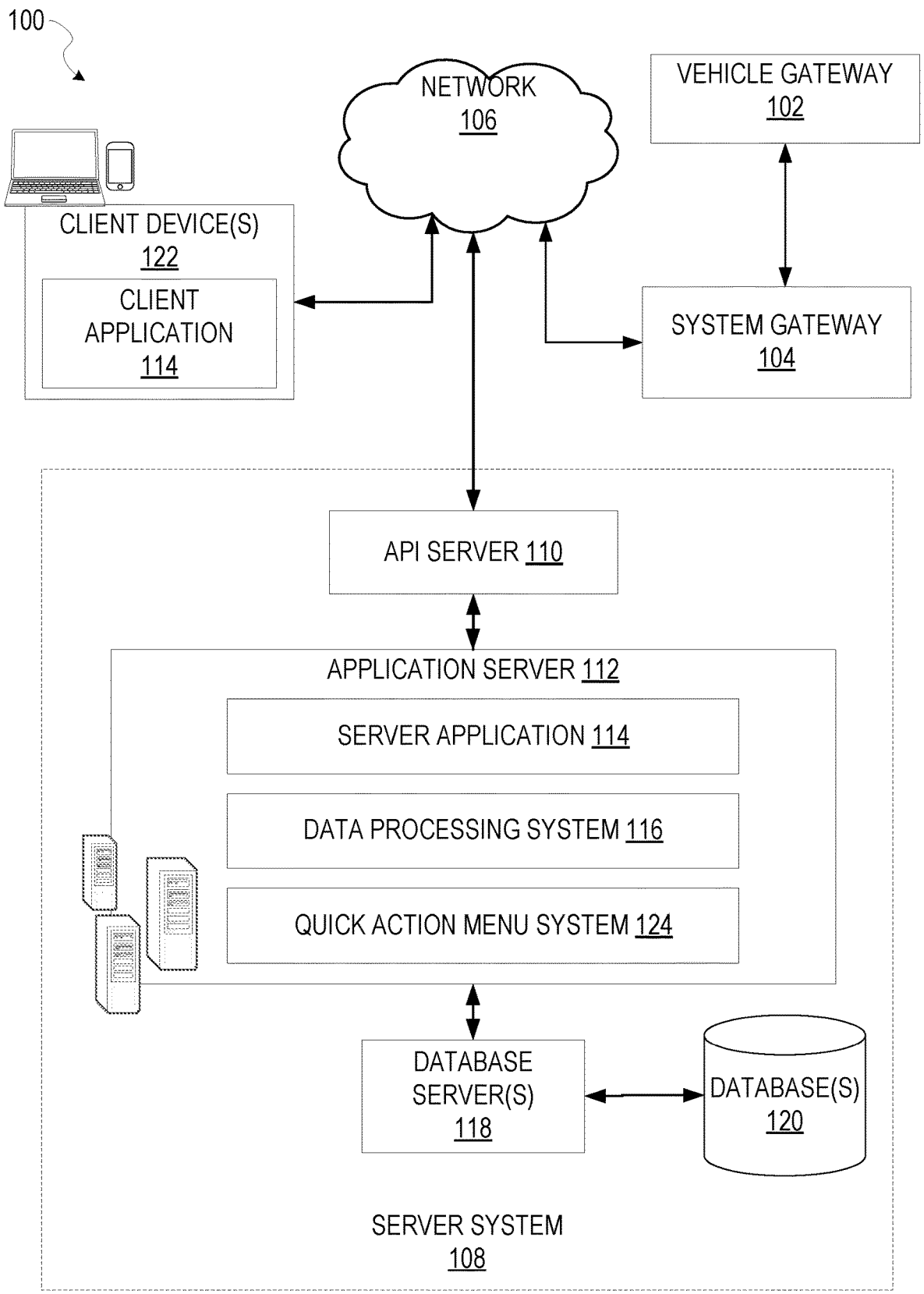
FIG. 1 is a block diagram showing an example system for exchanging data (e.g., sensor data and associated content) over a network in accordance with some embodiments, wherein the system includes a quick action menu system.

As discussed above, professional drivers, such as truck drivers, are increasingly reliant on mobile devices as a part of their daily workflows. For example, if a driver wants to view navigation instructions while also checking their current Hours of Service (HoS), they would need to manually switch between applications displayed at their mobile device. This can be very distracting and unsafe for drivers. The disclosed system therefore provides an interface to selectively display the most contextually relevant information.

According to certain example embodiments, a quick action menu system may be configured to perform operations that include: causing display of a graphical user interface (GUI) at a client device, the GUI comprising a display of a persistent icon at a position within the GUI; receiving a selection of the persistent icon from the client device; accessing user profile data associated with a user of the client device responsive to the input that selects the persistent icon; and causing display of a quick actions menu to display content associated with the user profile data.

In some embodiments, the user profile data may include one or more of: a duty status associated with the user of the client device, wherein the duty status provides an indication of whether they are driving or stopped (e.g., fuel stop, tire check, load check, etc.); a driver's HoS at any given time, wherein the HoS indicates the maximum allowable working hours for the driver, as well as how much rest the driver is required between shifts; Driver Vehicle Inspection Report (DVIR) information; route information, including names and locations of upcoming stops; as well as a vehicle identifier and a trailer identifier.

An administrator of the quick action menu system may provide inputs to assign content to one or more elements found within the user profile data associated with the user. For example, the administrator may provide inputs to configure information to be presented within the menu element based on a driver's duty status at a given time or based on a current position of the driver along a route. In some embodiments, the content may be associated with a particular driver identifier, vehicle identifier, a shipping identifier, or trailer identifier.

The content presented within the menu element may include a display of current statuses related to the user profile data, such as the driver's current HoS, as well as a name and location associated with the next stop along a current route of the driver. In some embodiments, the content may include messages received by the driver from a system administrator associated with the quick action menu system.

In some embodiments, an administrator of the quick action menu system may provide inputs to correlate one or more applications executed by the client device to the user profile data associated with the user of the client device. For example, the menu element may include a display of one or more icons that comprise deep links to the correlated applications, such that selection of an icon from among the one or more icons may cause the client device to execute a deep-link to the corresponding application. As an illustrative example, the administrator may assign an application configured to present DVIR data, to a duty status (i.e., driving) associated with the user of the client device, such that upon receiving an input to select the persistent icon while engaged in the duty status, the system may display a menu element that include an icon corresponding with the application.

FIG. 1 is a block diagram showing an example system 100 for sampling air quality, according to certain example embodiments. The system 100 includes one or more client devices 122 that host a number of applications including a client application 114.

Accordingly, each client application 114 is able to communicate and exchange data with another client application 114 and with the server application 114 executed at the server system 108 via the network 106. The data exchanged between client applications 114, and between a client application 114 and the server system 108, includes functions (e.g., commands to invoke functions) as well as payload data (e.g., text, audio, video or other multimedia data).

The server system 108 provides server-side functionality via the network 106 to a particular client application 114, and in some embodiments to the vehicle gateway 102 and the system gateway 104. While certain functions of the system 100 are described herein as being performed by either a client application 114, the vehicle gateway 102, the system gateway 104, or by the server system 108, it will be appreciated that the location of certain functionality either within the client application 114 or the server system 108 is a design choice. For example, it may be technically preferable to initially deploy certain technology and functionality within the server system 108, but to later migrate this technology and functionality to the client application 114, or one or more processors of the vehicle gateway 102, or system gateway 104, where there may be sufficient processing capacity.

The server system 108 supports various services and operations that are provided to the client application 114. Such operations include transmitting data to, receiving data from, and processing data generated by the client application 114, the vehicle gateway 102, and the system gateway 104. In some embodiments, the vehicle gateway 102 may include an odometer associated with a vehicle, as well as a GPS associated with the vehicle. In some embodiments, this data includes, message content, device information, geolocation information, persistence conditions, social network information, sensor data, and live event information, as examples. In other embodiments, other data is used. Data exchanges within the system 100 are invoked and controlled through functions available via graphical user interfaces (GUIs) of the client application 114.

Turning now specifically to the server system 108, an Application Program Interface (API) server 110 is coupled to, and provides a programmatic interface to, an application server 112. The application server 112 is communicatively coupled to a database server 118, which facilitates access to a database 120 that stores data associated with data generated by the Vehicle gateway 102 and processed by the application server 112.

Dealing specifically with the API server 110, this server receives and transmits data (e.g., sensor data, commands, and payloads) between the client device 122 and the application server 112. Specifically, the API server 110 provides a set of interfaces (e.g., routines and protocols) that can be called or queried by the client application 114 in order to invoke functionality of the application server 112. The API server 110 exposes various functions supported by the application server 112, including account registration, login functionality, the transmission of data, via the application server 112, from a particular client application 114 to another client application 114, the sending of sensor data (e.g., images, video, geolocation data, inertial data, temperature data, etc.) from a client application 114 to the server application 114, and for possible access by another client application 114, the setting of a collection of data, the retrieval of such collections, the retrieval of data, and the location of devices within a region.

The application server 112 hosts a number of applications and subsystems, including a server application 114, and a quick action menu system 124. According to certain example embodiments, the quick action menu system 124 is configured to perform operations to selectively display contextually relevant information within a menu element, responsive to selection of a persistent icon. Further details of the quick action menu system 124 can be found in FIG. 2 below.

The server application 114 implements a number of data processing technologies and functions, particularly related to the aggregation and other processing of data (e.g., sensor data generated by the vehicle gateway 102). As will be described in further detail, the sensor data, including temporal data, asset status data, and GPS data points, generated by the vehicle gateway 102 may be aggregated into collections associated with a particular user account. Other processor and memory intensive processing of data may also be performed server-side by the server application 114, in view of the hardware requirements for such processing.

The application server 112 is communicatively coupled to a database server 118, which facilitates access to a database 120 in which is stored data associated with sensor data generated by the vehicle gateway 102 and processed by the server application 114.

Figure 2:
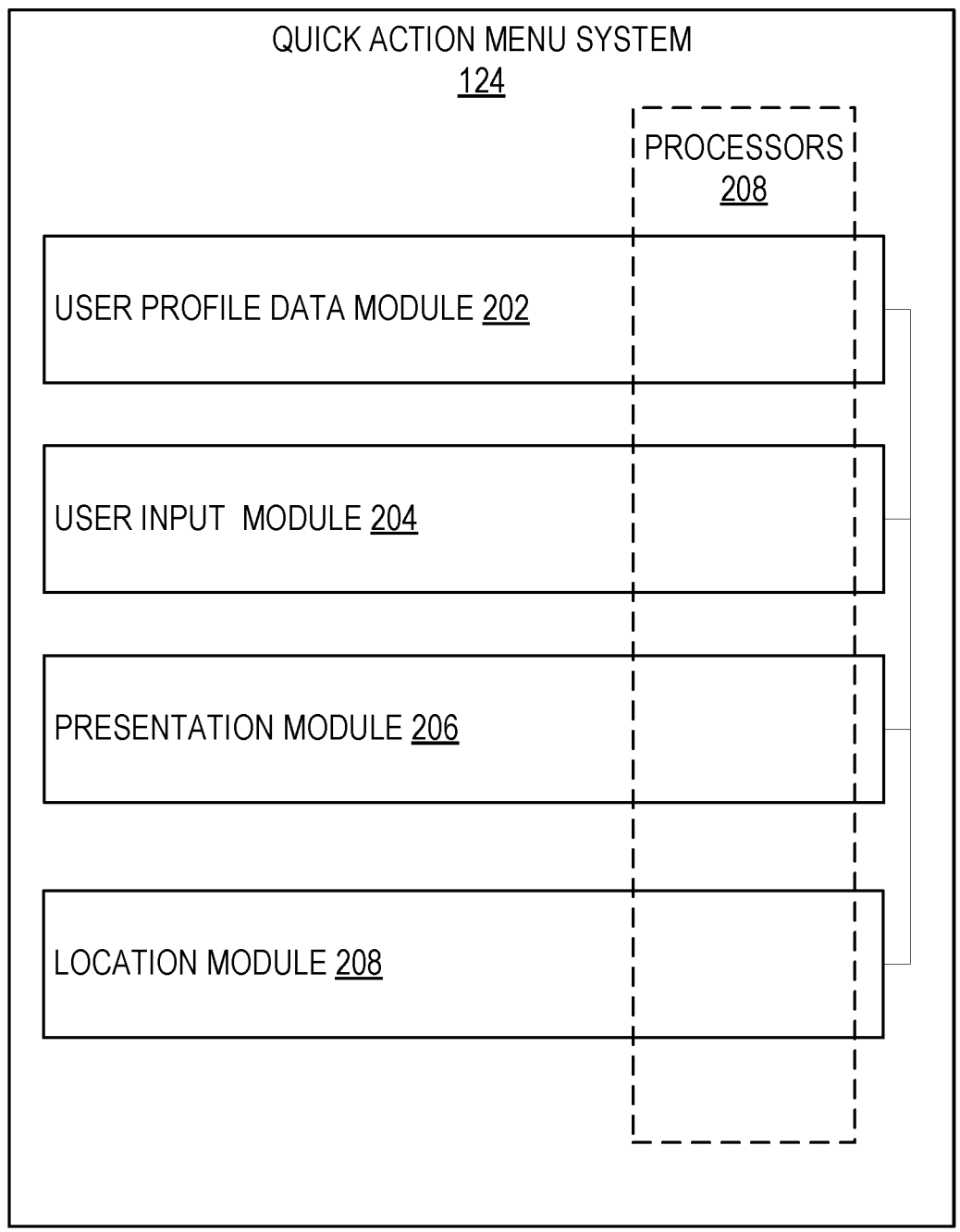
FIG. 2 is a block diagram illustrating various modules of a quick action menu system, according to certain example embodiments.

FIG. 2 is a block diagram 200 illustrating components of the quick action menu system 124 that configure the quick action menu system 124 to perform operations to selectively display contextually relevant information to a user, responsive to receiving an input that selects a persistent icon presented within a GUI of the client device 122, according to some example embodiments.

The quick action menu system 124 is shown as including user profile module 202, a user input module 204, a presentation module 206, and a location module 208, all configured to communicate with each other (e.g., via a bus, shared memory, or a switch). Any one or more of these modules may be implemented using one or more processors 210 (e.g., by configuring such one or more processors to perform functions described for that module) and hence may include one or more of the processors 210.

Any one or more of the modules described may be implemented using hardware alone (e.g., one or more of the processors 210 of a machine) or a combination of hardware and software. For example, any module described of the quick action menu system 124 may physically include an arrangement of one or more of the processors 210 (e.g., a subset of or among the one or more processors of the machine) configured to perform the operations described herein for that module. As another example, any module of the quick action menu system 124 may include software, hardware, or both, that configure an arrangement of one or more processors 210 (e.g., among the one or more processors of the machine) to perform the operations described herein for that module. Accordingly, different modules of the quick action menu system 124 may include and configure different arrangements of such processors 210 or a single arrangement of such processors 210 at different points in time. Moreover, any two or more modules of the quick action menu system 124 may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
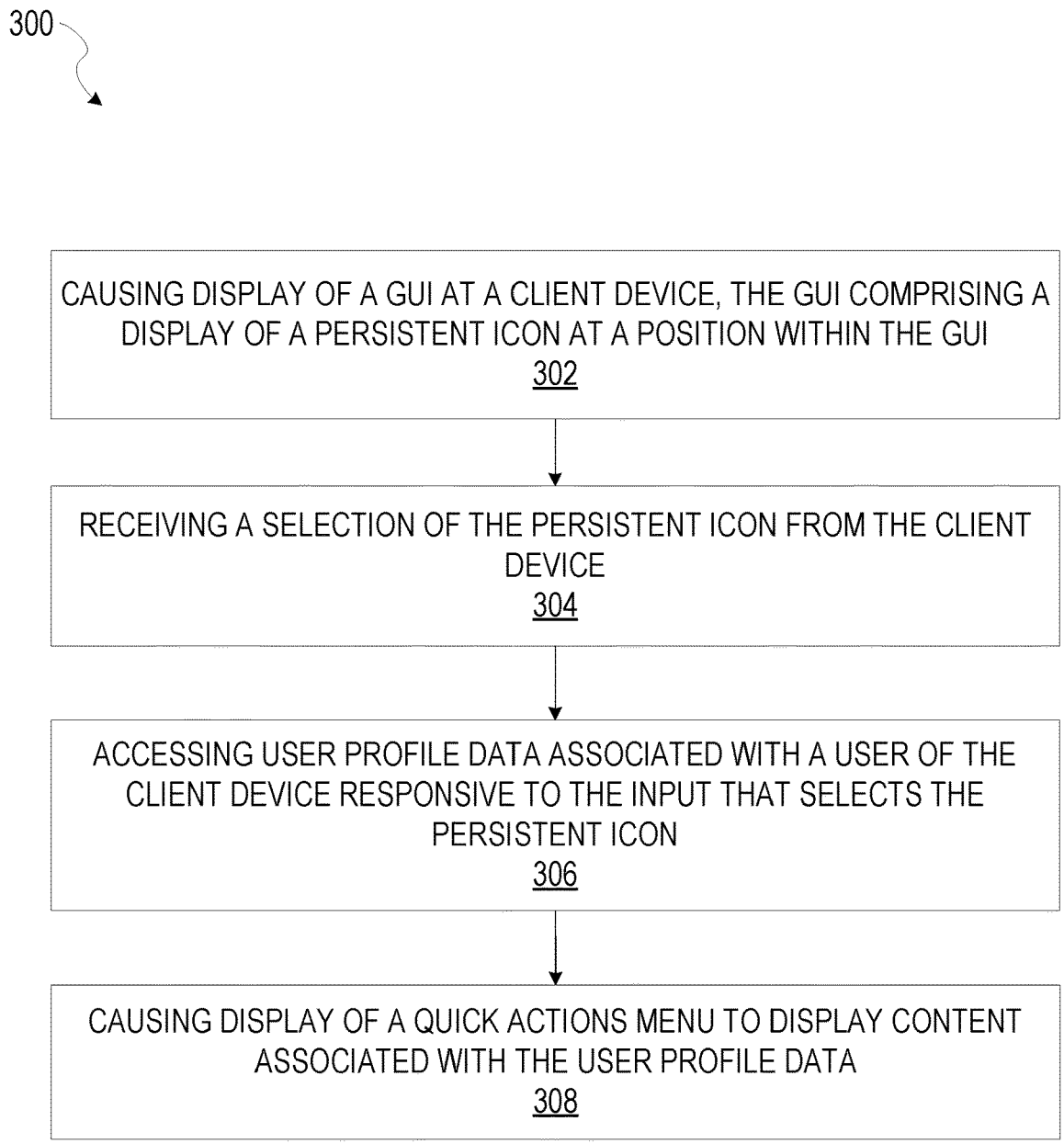
FIG. 3 is a flowchart depicting a method of selectively presenting content within a GUI, according to certain example embodiments.

FIG. 3 is a flowchart depicting a method 300 of selectively presenting content within a GUI of a client device 122, according to certain example embodiments. Operations of the method 300 may be performed by the modules described above with respect to FIG. 2. As shown in FIG. 3, the method 300 includes one or more operations 302, 304, 306, and 308.

At operation 302, the presentation module 206 causes display of a GUI at a client device 122, wherein the GUI comprises a display of a persistent icon at a position within the GUI. As discussed herein, a persistent icon may include a graphical icon which may be presented "persistently" within a GUI of the client device 122, regardless of what application is being executed by the client device 122, or whatever content is being displayed within the GUI of the client device 122.

In some embodiments, the persistent icon may be presented within a header element of the GUI. For example, the quick action menu system 124 may be configured to display a header element within the GUI, wherein the header element includes a display of one or more user selectable icons that include the persistent icon.

In some embodiments, the persistent icon may include a graphical element that may be moved or placed at a position within the GUI of the client device 122, by a user or administrator associated with the client device 122.

At operation 304, the user input module 204 receives an input that selects the persistent icon from a user of the client device 122. For example, the client device 122 may comprise one or more I/O components configured to receive inputs from a user of the client device 122, such as a tactile input.

In some embodiments, the user input module 204 may be configured to provide an input to the quick action menu system 124 responsive to the detection of some trigger condition. For example, the trigger condition may include: the detection of motion; determining that a vehicle associated with the user of the client device 122 has transgressed a threshold speed; or determining that the vehicle associated with the user of the client device 122 has entered into a geo-fenced location.

Responsive to receiving the input that selects the persistent icon, the user profile module 202 accesses user profile data associated with a user of the client device 122. The user profile data may comprise: a user identifier associated with the user; a duty status associated with the user of the client device, wherein the duty status provides an indication of whether they are driving or stopped (e.g., fuel stop, tire check, load check, etc.); a driver's HoS at any given time, wherein the HoS indicates the maximum allowable working hours for the driver, as well as how much rest the driver is required between shifts; DVIR information; route information, including names and locations of upcoming stops; as well as a vehicle identifier and a trailer identifier.

In some embodiments, an administrator associated with the quick action menu system 124 may provide inputs to correlate the various attributes from with the user profile data to content which may be presented to the user within a menu element. Accordingly, the correlations may be hosted within the databases 120, such that the quick action menu system 124 may access the database 120 to determine relevant content to be presented to the user within the GUI of the client device 122.

Accordingly, at operation 308, the presentation module 206 generates and causes display of a presentation of a menu element to selectively display relevant content to the user of the client device 122, based on the user profile data associated with the user.

In some embodiments, the content may include various metrics associated with a vehicle, or with the user. The quick action menu system 124 may present various content based on a determination of the user's current duty status or based on a current location of the user along a route.

For example, the content presented within the menu element may include a display of current statuses related to the user profile data, such as the driver's current HoS, as well as a name and location associated with the next stop along a current route of the driver. In some embodiments, the content may include messages received by the driver from a system administrator associated with the quick action menu system.

In some embodiments, the content may include icons that comprise deep-links to one or more applications which may be relevant to a user of the client device 122 based on the user profile data associated with the user. For example, the database 120 may include correlations of various applications to user attributes indicated within the user profile data, such as a user identifier, a vehicle identifier, a trailer identifier, etc.

Figure 5:
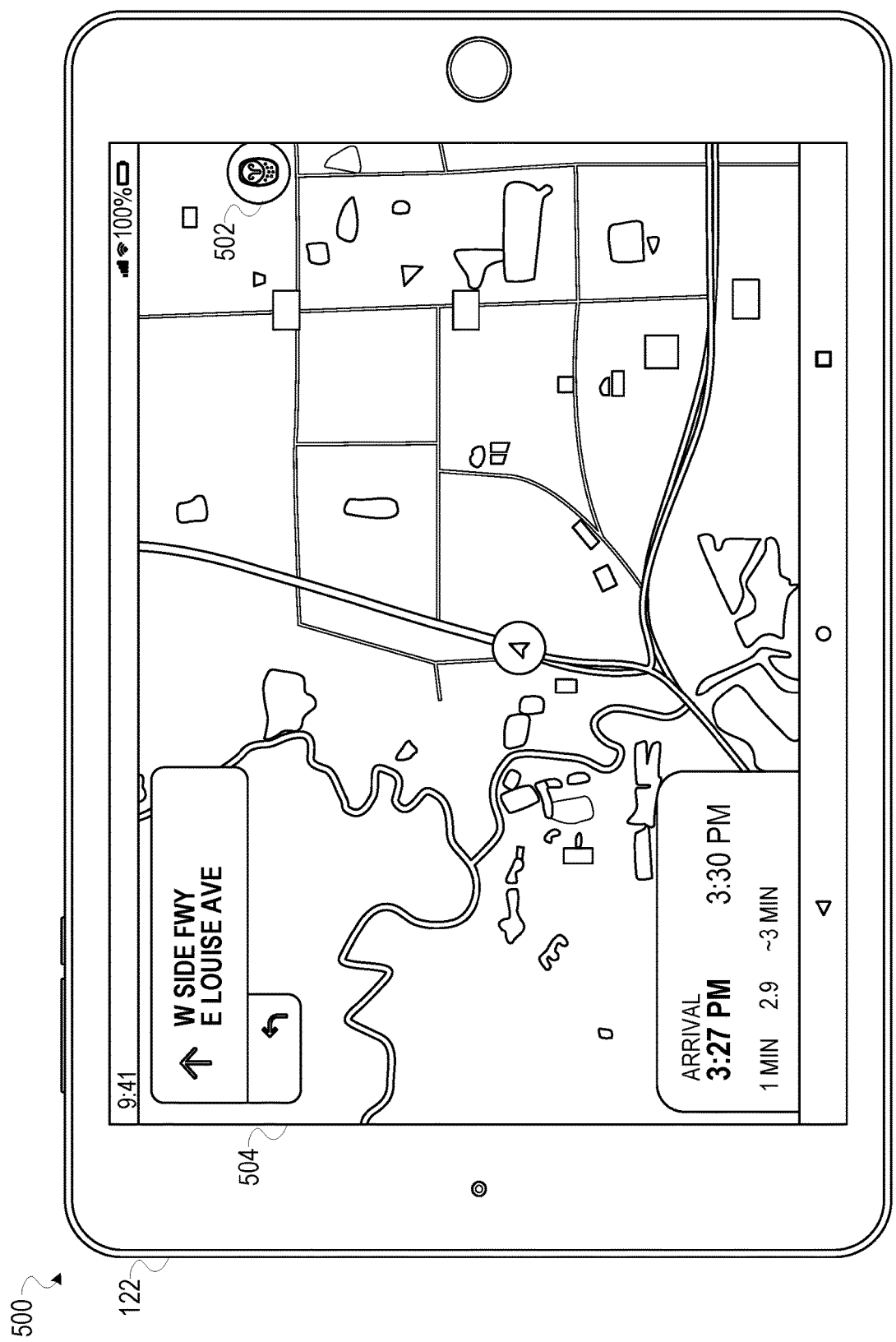
FIG. 5 is an interface diagram depicting a GUI presented by a quick action menu system, according to certain example embodiments.
Figure 6:
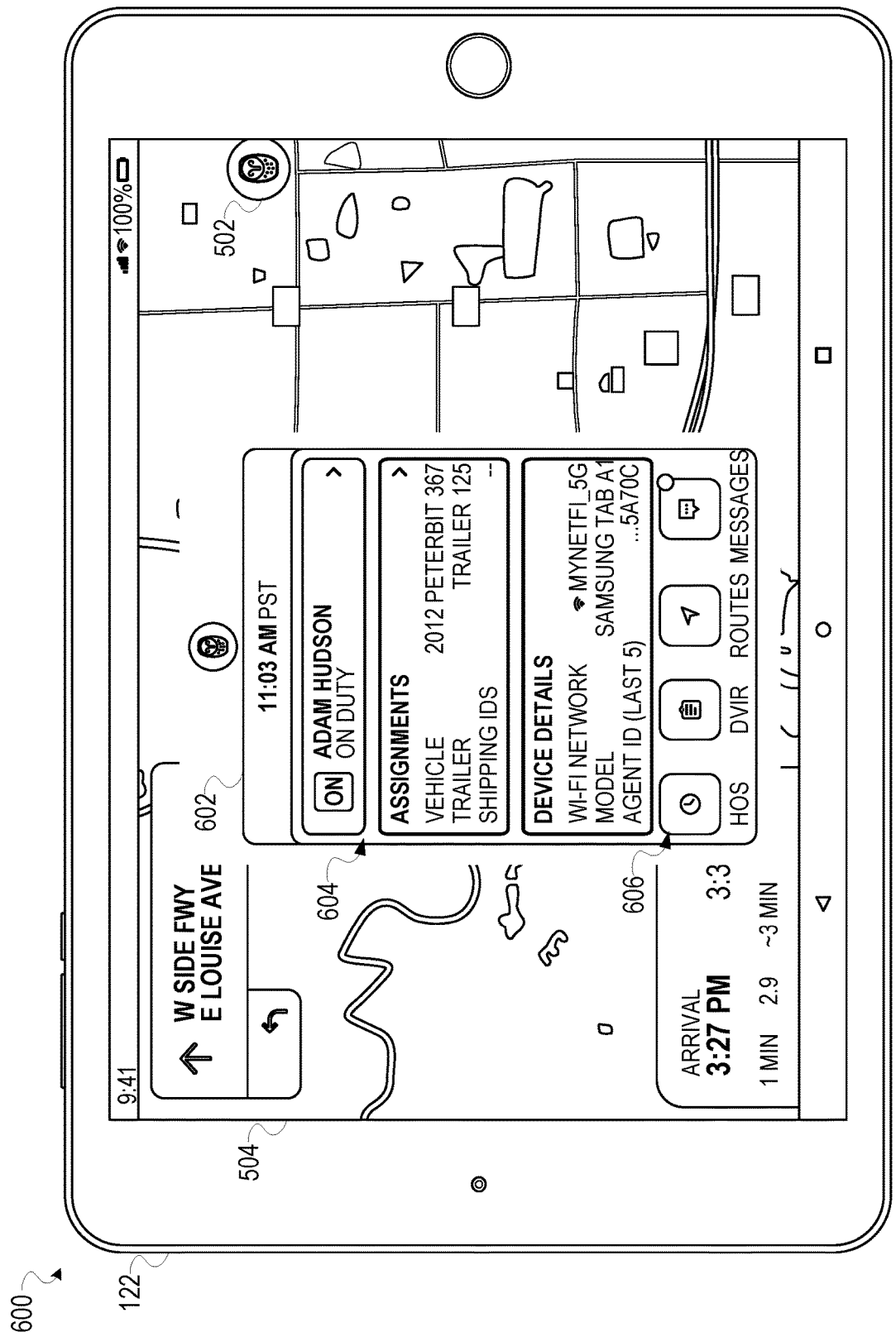
FIG. 6 is an interface diagram depicting a GUI presented by a quick action menu system, according to certain example embodiments.
Figure 7:
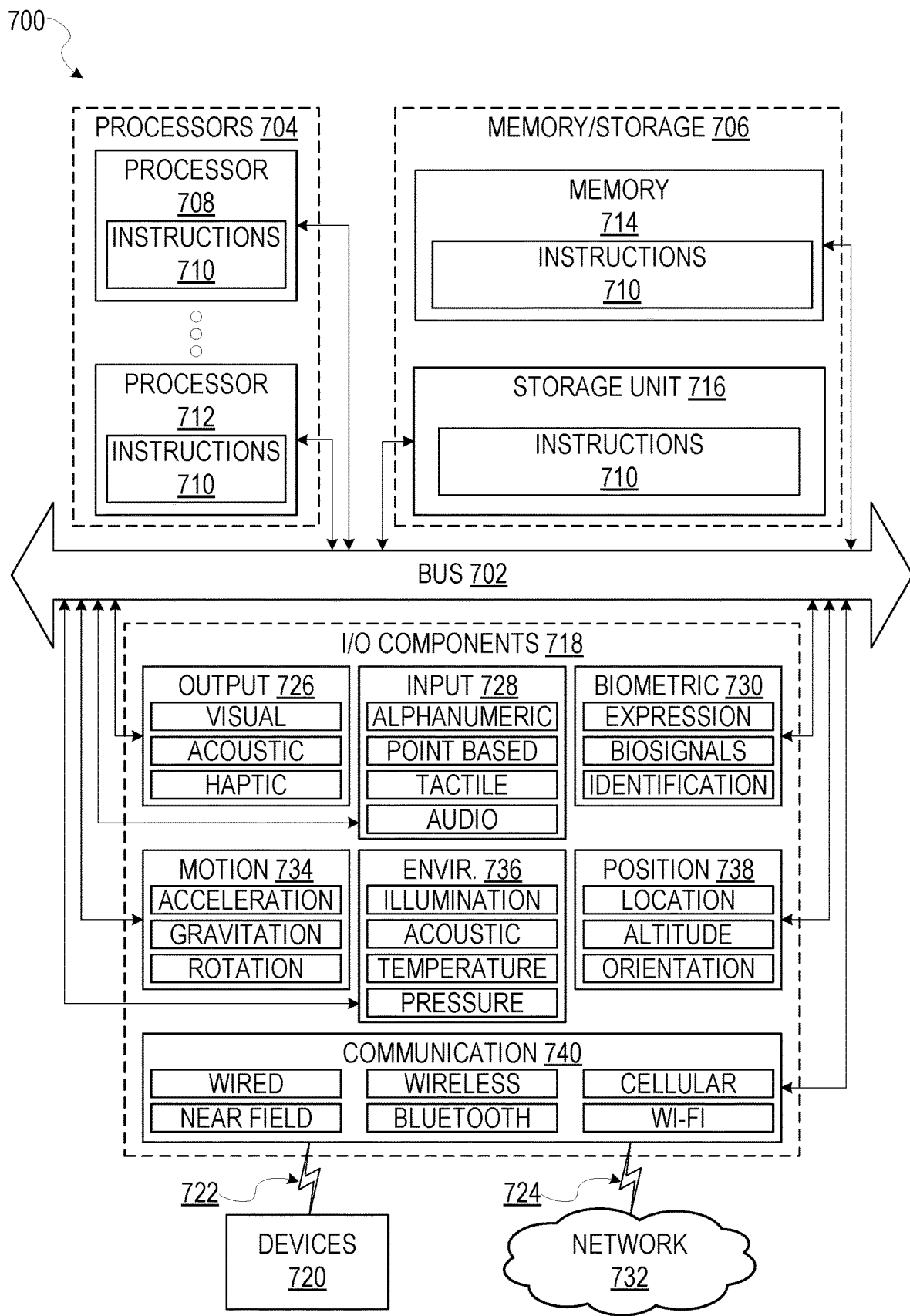
FIG. 7 is a block diagram illustrating components of a machine, according to some example embodiments, able to read instructions from a machine-readable medium (e.g., a machine-readable storage medium) and perform any one or more of the methodologies discussed herein.

Further details related to the menu element, and contents which may be presented within the menu element are depicted in FIGS. 5, 6 and 7.

Figure 4:
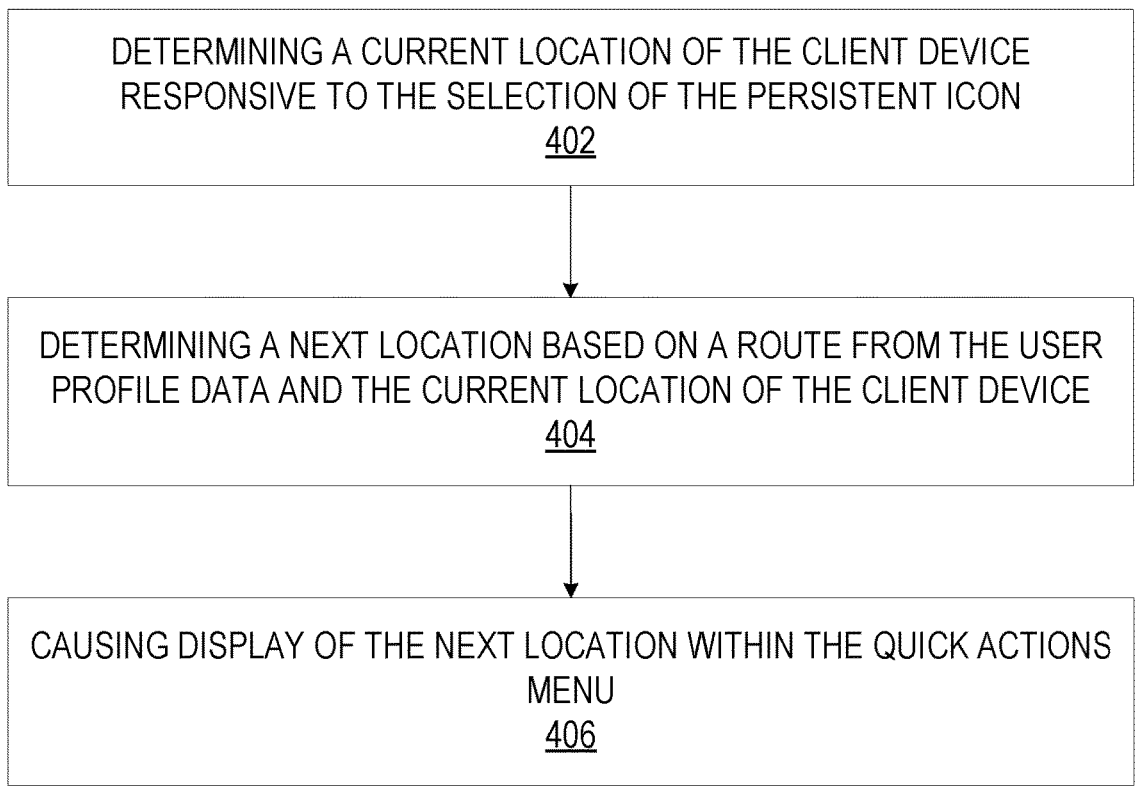
FIG. 4 is a flowchart depicting a method of selectively presenting content within a GUI, according to certain example embodiments.

FIG. 4 is a flowchart depicting a method 400 of selectively presenting content within a GUI of a client device 122, according to certain example embodiments. Operations of the method 400 may be performed by the modules described above with respect to FIG. 2. In some embodiments, the method 400 may be performed as a precursor or subroutine of operation 306 of the method 300 depicted in FIG. 3. As shown in FIG. 4, the method 400 includes one or more operations 402, 404, and 406.

In some embodiments, the quick action menu system 124 may be configured to present content within the menu element based on a route associated with the user of the client device 122. For example, at operation 402, responsive to receiving an input that selects the persistent icon, the location module 208 may determine a current location associated with the client device 122, wherein the current location may provide an indication of a status of the user along a route indicated within the user profile data.

At operation 404, the user profile data module 202 accesses a route from among the user profile data associated with the user in order to determine a next location along the route, based on the current location.

At operation 406, the presentation module 206 causes display of a presentation of an indication of the next location along the route within the menu element at the client device 122. The indication of the next location may for example include a display of a name or address associated with the location or may include a display of a map image that include the location.

FIG. 5 is an interface diagram 500 depicting a GUI 504 presented at a client device 122 by the quick action menu system 124, according to certain example embodiments. As seen in the interface diagram 500, the GUI 504 may include a display of a persistent icon 502 at a position within the GUI 504.

As discussed in the methods 300, and 400, the persistent icon 502 may be presented at a position within the GUI 504 regardless of what application or content is being presented by the client device 122. Accordingly, a user may access a menu element to display a selection of curated contextually relevant content via a selection of the persistent icon 502.

FIG. 6 is an interface diagram 600 depicting a GUI 504 presented by the quick action menu system 124, that includes a menu element 602 to selectively display curated, contextually relevant content, according to certain example embodiments.

As seen in FIG. 6, the menu element 602 may include a display of content 604, wherein the content may be curated by an administrator associated with the quick action menu system 124. For example, as discussed above, an administrator of the quick action menu system 124 may provide inputs to correlate various user attributes to the content 604 presented within the menu element 602.

According to certain example embodiments, the content 604 may further comprise a set of icons 606, wherein the set of icons 606 comprise deep-links to applications correlated with user profile data associated with the client device 122.

Consider an illustrative example from a user perspective. A user of the client device 122 may provide an input to select the persistent icon 502 from within the GUI 504 of the client device 122. Responsive to receiving the input that selects the persistent icon 502, the quick action menu system 124 accesses user profile data associated with the user of the client device 122, wherein the user profile data provide an indication of various user attributes associated with the user, including the user's duty status, a vehicle identifier associated with the user, a route associated with the user, and various shipping details associated with the user. The quick action menu system 124 may thereby generate a menu element that comprises a display of content based on the user attributes of the user and causes display of a presentation of the menu element at a position within the GUI 504 of the client device 122. Accordingly, the user may easily access relevant information quickly and without the need to switch between applications executed by the client device 122.

FIG. 7 is a block diagram illustrating components of a machine 700, according to some example embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 710 (e.g., software, a program, an application, an applet, an app, or other executable code) for causing the machine 700 to perform any one or more of the methodologies discussed herein may be executed. As such, the instructions 710 may be used to implement modules or components described herein. The instructions 710 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), other smart devices, a web appliance, a network router, a network switch, a network bridge, or any machine capable of executing the instructions 710, sequentially or otherwise, that specify actions to be taken by machine 700. Further, while only a single machine 700 is illustrated, the term "machine" shall also be taken to include a collection of machines that individually or jointly execute the instructions 710 to perform any one or more of the methodologies discussed herein.

The machine 700 may include processors 704, memory memory/storage 706, and I/O components 718, which may be configured to communicate with each other such as via a bus 702. The memory/storage 706 may include a memory 714, such as a main memory, or other memory storage, and a storage unit 716, both accessible to the processors 704 such as via the bus 702. The storage unit 716 and memory 714 store the instructions 710 embodying any one or more of the methodologies or functions described herein. The instructions 710 may also reside, completely or partially, within the memory 714, within the storage unit 716, within at least one of the processors 704 (e.g., within the processor's cache memory), or any suitable combination thereof, during execution thereof by the machine 700. Accordingly, the memory 714, the storage unit 716, and the memory of processors 704 are examples of machine-readable media.

The I/O components 718 may include a wide variety of components to receive input, provide output, produce output, transmit information, exchange information, capture measurements, and so on. The specific I/O components 718 that are included in a particular machine 700 will depend on the type of machine. For example, portable machines such as mobile phones will likely include a touch input device or other such input mechanisms, while a headless server machine will likely not include such a touch input device. It will be appreciated that the I/O components 718 may include many other components that are not shown in FIG. 7. The I/O components 718 are grouped according to functionality merely for simplifying the following discussion and the grouping is in no way limiting. In various example embodiments, the I/O components 718 may include output components 726 and input components 728. The output components 726 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 728 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 718 may include biometric components 730, motion components 734, environmental environment components 736, or position components 738 among a wide array of other components. For example, the biometric components 730 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 734 may include acceleration sensor components (e.g., accelerometer), gravitation sensor components, rotation sensor components (e.g., gyroscope), and so forth. The environment components 736 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 738 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 718 may include communication components 740 operable to couple the machine 700 to a network 732 or devices 720 via coupling 722 and coupling 724 respectively. For example, the communication components 740 may include a network interface component or other suitable device to interface with the network 732. In further examples, communication components 740 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 720 may be another machine or any of a wide variety of peripheral devices (e.g., a peripheral device coupled via a Universal Serial Bus (USB)).

Moreover, the communication components 740 may detect identifiers or include components operable to detect identifiers. For example, the communication components 740 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 740, such as, location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

What is claimed is:

1. A method comprising:
    receiving an input that correlates content to a user attribute;
    receiving a request from a client device associated with a user profile of a user, the user profile comprising user profile data that includes the user attribute;
    accessing the content responsive to the request from the client device; and
    causing display of a menu element to display the content at the client device, the content includes one or more graphical icons that comprise deep links to one or more applications.

2. The method of claim 1, wherein the user attribute comprises an indication of a duty status associated with the user of the client device, and wherein the content corresponds with the duty status.

3. The method of claim 1, wherein the method further comprises:
receiving an input that assigns the content to the user attribute.

4. The method of claim 3, wherein the user profile further comprises one or more of:
a user identifier;
a vehicle identifier;
a trailer identifier; and
a shipping identifier.

5. The method of claim 1, wherein the input associates with a selection of a persistent icon, the user profile data comprises a route associated with the user of the client device, the route comprising one or more locations, and the causing display of the menu element to display the content associated with the user attribute further comprises:
determining a current location of the client device responsive to the selection of the persistent icon;
determining a next location based on the route and the current location of the client device; and
wherein a quick action menu includes an indication of the next location.

6. The method of claim 1, wherein the method further comprises:
determining an Hours of Service (HoS) associated with the user based on the user attribute; and
wherein the menu element includes a presentation of the HoS.

7. A system comprising:
a memory; and
at least one hardware processor to perform operations comprising:
receiving an input that correlates content to a user attribute;
receiving a request from a client device associated with a user profile of a user, the user profile comprising user profile data that includes the user attribute;
accessing the content responsive to the request from the client device; and
causing display of a menu element to display the content at the client device, the content includes one or more graphical icons that comprise deep links to one or more applications.

8. The system of claim 7, wherein the user attribute comprises an indication of a duty status associated with the user of the client device, and wherein the content corresponds with the duty status.

9. The system of claim 7, further comprising:
receiving an input that assigns the content to the user attribute.

10. The system of claim 9, wherein the user profile further comprises one or more of:
a user identifier;
a vehicle identifier;
a trailer identifier; and
a shipping identifier.

11. The system of claim 7, wherein the input associates with a selection of a persistent icon, the user profile data comprises a route associated with the user of the client device, the route comprising one or more locations, and the causing display of the menu element to display the content associated with the user attribute further comprises:
determining a current location of the client device responsive to the selection of the persistent icon;
determining a next location based on the route and the current location of the client device; and
wherein a quick action menu includes an indication of the next location.

12. The system of claim 7, further comprising:
determining an Hours of Service (HoS) associated with the user based on the user attribute; and
wherein the menu element includes a presentation of the HoS.

13. A non-transitory machine-readable storage medium comprising instructions that, when executed by one or more processors of a machine, cause the machine to perform operations comprising:
receiving an input that correlates content to a user attribute;
receiving a request from a client device associated with a user profile of a user, the user profile comprising user profile data that includes the user attribute;
accessing the content responsive to the request from the client device; and
causing display of a menu element to display the content at the client device, the content includes one or more graphical icons that comprise deep links to one or more applications.

14. The non-transitory machine-readable storage medium of claim 13, wherein the user attribute comprises an indication of a duty status associated with the user of the client device, and wherein the content corresponds with the duty status.

15. The non-transitory machine-readable storage medium of claim 13, further comprising:
receiving an input that assigns the content to the user attribute.

16. The non-transitory machine-readable storage medium of claim 15, wherein the user profile further comprises one or more of:
a user identifier;
a vehicle identifier;
a trailer identifier; and
a shipping identifier.

17. The non-transitory machine-readable storage medium of claim 13, wherein the input associates with a selection of a persistent icon, the user profile data comprises a route associated with the user of the client device, the route comprising one or more locations, and the causing display of the menu element to display the content associated with the user attribute further comprises:
determining a current location of the client device responsive to the selection of the persistent icon;
determining a next location based on the route and the current location of the client device; and
wherein a quick action menu includes an indication of the next location.

* * * * *

UNITED STATES PATENT AND TRADEMARK OFFICE
CERTIFICATE OF CORRECTION

| | | |
|---|---|---|
| PATENT NO. | : 12,150,007 B1 | Page 1 of 1 |
| APPLICATION NO. | : 18/467014 | |
| DATED | : November 19, 2024 | |
| INVENTOR(S) | : Dugar et al. | |

It is certified that error appears in the above-identified patent and that said Letters Patent is hereby corrected as shown below:

In the Drawings

Sheet 2 of 7, Fig. 2, reference numeral 208, Lines 1-2, delete "PROCESSORS 208" and insert --PROCESSORS 210-- therefor In the Specification In Column 8, Lines 4-5, delete "memory memory/storage" and insert --memory/storage-- therefor In Column 8, Line 54, delete "environmental environment components" and insert --environment components-- therefor Signed and Sealed this
Twenty-third Day of September, 2025

John A. Squires
*Director of the United States Patent and Trademark Office*